United States Patent [19]

Haslim

[11] Patent Number: 5,020,742

[45] Date of Patent: Jun. 4, 1991

[54] AIRBORNE RESCUE SYSTEM

[75] Inventor: Leonard A. Haslim, Hayward, Calif.

[73] Assignee: The United States of America as represented by the Administrator of National Aeronautics and Space Administration, Washington, D.C.

[21] Appl. No.: 418,320

[22] Filed: Oct. 6, 1989

[51] Int. Cl.[5] ............... B64D 1/08; B64D 9/00; B64C 1/22; B63C 9/01
[52] U.S. Cl. ................... 244/137.2; 441/83
[58] Field of Search ............... 244/137.2; 441/83; 119/29, 151, 153; 294/19.1

[56] References Cited

U.S. PATENT DOCUMENTS

| | | | |
|---|---|---|---|
| 580,896 | 4/1897 | Quackenbush | 294/19.1 |
| 1,208,624 | 12/1916 | Newman | 294/19.1 X |
| 2,738,939 | 3/1956 | Johnson | 244/137.2 |
| 2,944,518 | 7/1960 | Hawks | 119/29 X |
| 2,969,210 | 1/1961 | Richardson et al. | 244/137.2 |
| 3,036,315 | 5/1962 | Karnow | 244/137.2 X |
| 3,039,746 | 6/1962 | Meyers | 244/137.4 X |
| 3,228,044 | 1/1966 | Mattenson | 244/137.2 X |
| 3,601,342 | 8/1971 | Piasecki | 244/137.4 |
| 3,677,507 | 7/1972 | Kendall et al. | 244/137.4 |
| 4,113,207 | 9/1978 | Dalziel | 244/137.2 |
| 4,188,000 | 2/1980 | Dalziel | 244/137.2 |
| 4,588,148 | 5/1986 | Krauchick | 244/137.2 |

FOREIGN PATENT DOCUMENTS

| | | | |
|---|---|---|---|
| 2387051 | 11/1978 | France | 244/137.2 |
| 2428567 | 2/1980 | France | 244/137.2 |
| 2019519 | 10/1979 | United Kingdom | 294/19.1 |

Primary Examiner—Margaret A. Focarino
Assistant Examiner—James M. Kannofsky
Attorney, Agent, or Firm—Darrell G. Brekke; Harold W. Adams; John R. Manning

[57] ABSTRACT

This airborne rescue system includes a boom (25) with telescoping members (31) for extending a line (19) and collar (14) to a rescue victim (16). The boom extends beyond the tip of the helicopter rotor (18) so that the victim may avoid in the rotor downwash. The rescue line is payed out and reeled in by winch (23). The line is temporarily retained under boom (25). When the boom is extended, the rescue line passes through clips (28). When the victim dons the collar and the tension in the line reaches a predetermined level, the clips open and release the line from the boom. Then the rescue line can form a straight line between the victim and the winch, and the victim can be lifted to the helicopter. A translator (57) is utilized to push out or pull in the telescoping members. The translator comprises a tape (58) and a rope (59). Inside the telescoping members the tape is curled around the rope and the tape has a tube-like configuration. The tape and rope are provided from supply spools 81 and 82, respectively.

14 Claims, 6 Drawing Sheets

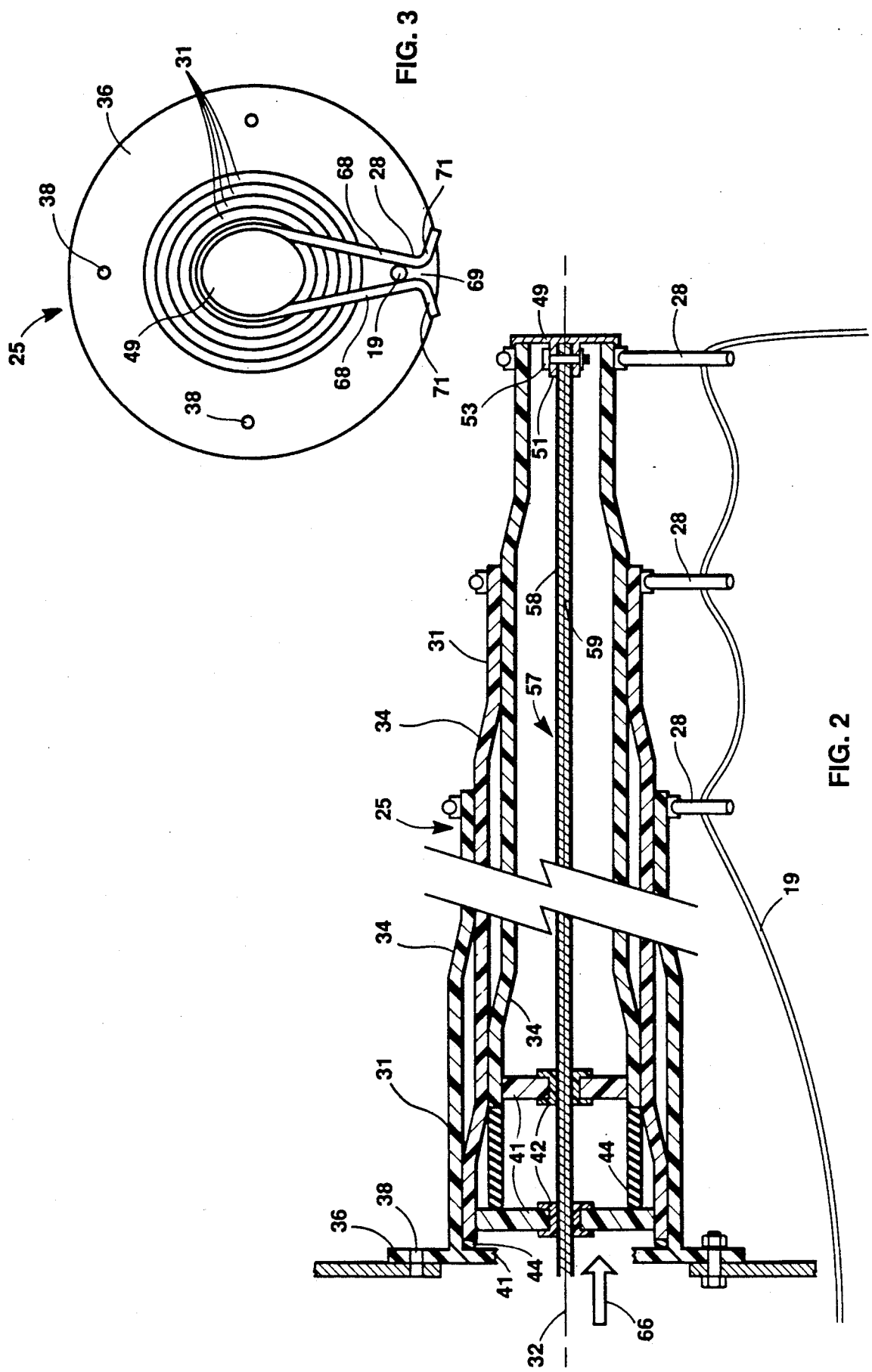

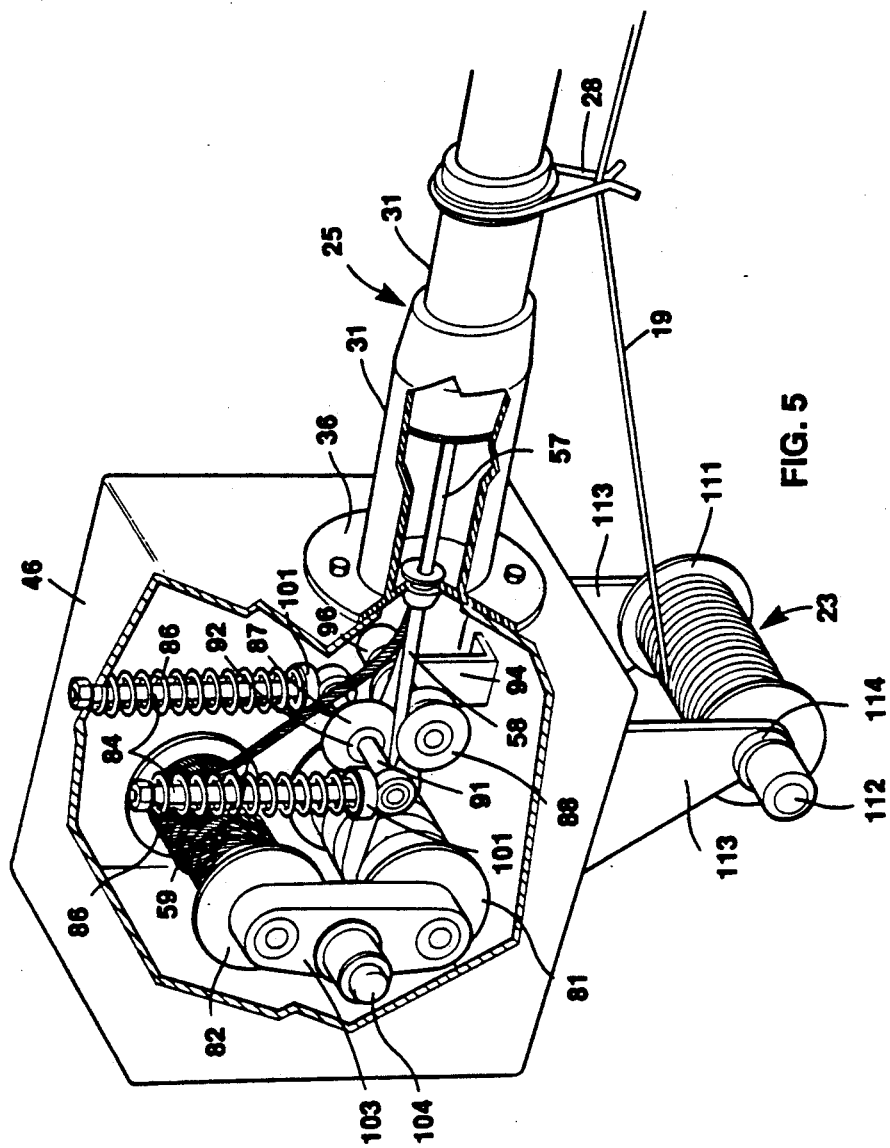

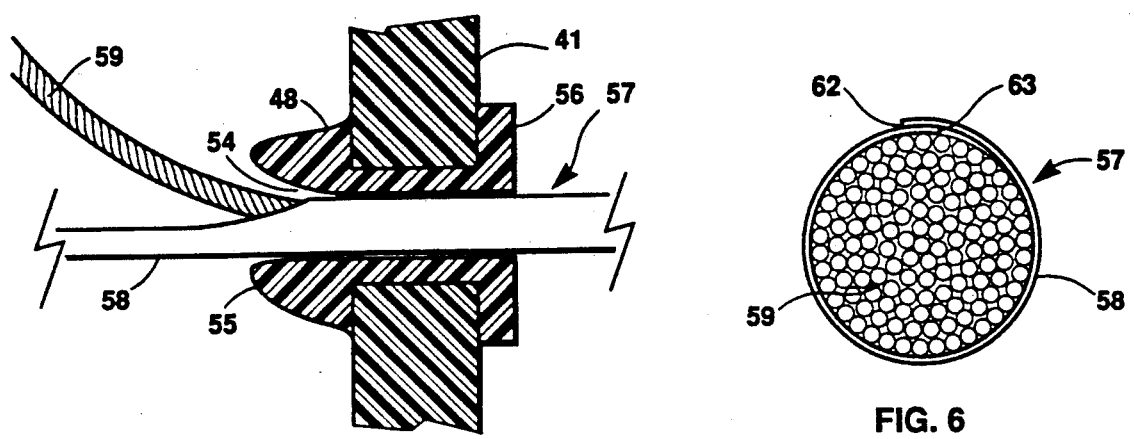
FIG. 7
FIG. 6
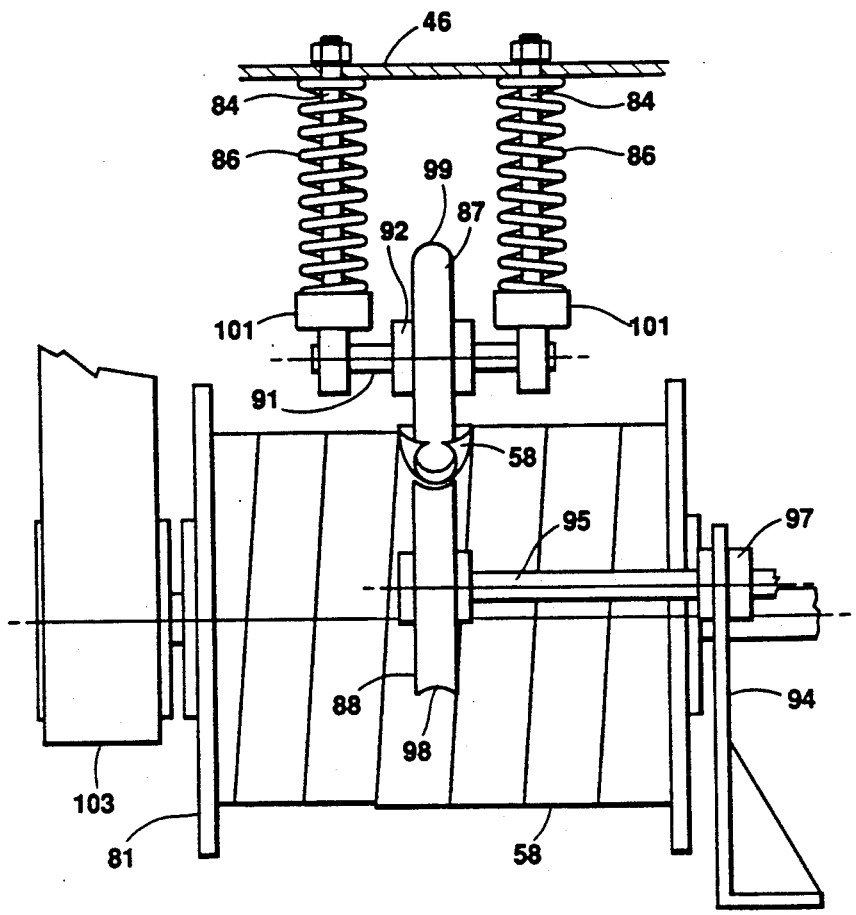
FIG. 8

AIRBORNE RESCUE SYSTEM

TECHNICAL FIELD

This invention relates to an aerial rescue system and more particularly to an apparatus intended for the rescue of personnel via a helicopter.

BACKGROUND ART

Aircraft have been utilized for a long time to rescue pilots downed at sea as well as sailors or fishermen who have had to abandon a boat or ship. Fixed-wing seaplanes have speed, range, endurance and payload attributes; however, they cannot land or take off effectively in high sea states. Helicopters have the unique capability of being able to hover over or near the rescue site, and much work is being undertaken to provide helicopters with all-weather flying capability as well as speed, range and payload improvements. The one drawback associated with helicopter rescue operations at sea is the problem caused by the severe blowing action of the main rotor downwash. The victim to be rescued is frequently blown away or obscured while the helicopter hovers directly overhead. Some drownings have been attributable to the downwash. Apart from the downwash caused by the helicopter main rotor, it is difficult for the helicopter pilot to see the rescue line when it dropped behind him as for example through a floor hatch.

It is well known to lower a net on a line from a helicopter for the purpose of rescuing a victim. See for example, U.S. Pat. No. 3,036,315 granted to Karnow, U.S. Pat. No. 3,228,044 issued to Mattenson or U.S. Pat. No. 4,138,077 granted to Okumura. The prior art also reveals helicopter supported rescue capsules, or gondolas in U.S. Pat. No. 3,467,346 (Carson), U.S. Pat. No. 3,931,868 (Smith), and U.S. Pat. No. 3,934,847 (Bentivegna). U.S. Pat. No. 4,113,207 granted to David G. Dalziel on Sept. 12, 1978 shows an articulated boom helicopter rescue device for snatching a victim from a ledge of a building. The two-section boom has a centrally located pivot that permits the remotest section to pivot or fold downwardly and back toward the helicopter. Part of the boom always protrudes from the nose of the helicopter and the boom must be structurally fit to accommodate the weight of the rescue victim even if the load is for a short duration. Picking up the victim with the boom causes undesirable torques on the helicopter which the pilot must counterbalance.

SUMMARY OF THE INVENTION

Accordingly, it is an object of this invention to provide a helicopter rescue system that may be positioned in the line of vision of the pilot.

It is another object of the invention to provide a helicopter rescue system that minimizes undesirable torques on the helicopter.

It is a further object of the invention to provide a helicopter rescue system that reduces exposure of the rescue victim to downwash created by the main rotor of the helicopter.

It is still further an object of the invention to provide a helicopter rescue system that enables a rescue line to be extended to the rescue victim while the victim is laterally remote from the helicopter, thereby enabling pilot visual contact with the rescuee to be maintained.

It is still further an object of this invention to provide a helicopter rescue system that permits positioning the rescue line between obstacles such as masts and superstructures during shipboard rescues.

The attainment of these and related objects may be achieved through the use of the novel airborne rescue system herein disclosed. An airborne rescue system in accordance with this invention has a lightweight telescoping boom that is adapted to be mounted on or near the roof of a helicopter. A rescue line from a winch is threaded through clips on the boom. A rescue collar, basket or cage is connected to the distal end of the line to facilitate the hauling in of the person in need of rescue. A novel translator in the form of a tube-like tape that is filled with a flexible non-compressible rope like element is utilized to extend and retract the boom. In use, the rescue line is threaded through the clips and the boom is extended beyond the radius of the helicopter main rotor. As the helicopter is maneuvered for the rescue operation, sufficient line is payed out from the winch for the rescue collar to reach the rescue victim. Once the victim dons the collar and tension is increased in the line (through helicopter lifting and/or winch action), a predetermined downward tension level is reached wherein the clips sequentially open and release the line from the boom. The helicopter may then hover directly over the rescue victim while the victim is lifted to the helicopter by the winch. The boom may be retracted as soon as the rescue line is released from the clips and an operator may reload the clips with the line as soon as the victim is brought aboard the helicopter. As the telescoping boom is not used to actually lift the rescue victim, the boom only has to be strong enough to support the rescue line and the collar. The pilot can see the extended boom and end of rescue line himself and he does not have to rely on flight instructions received from other parties aboard the helicopter to precisely position the collar.

The advantages and features of the invention should be more readily apparent to those skilled in the art after review of the following more detailed description of the invention, taken along with the drawings.

BRIEF DESCRIPTION OF THE DRAWINGS

FIG. 2 is side cross section view of the boom in a retracted state.

FIG. 3 is an end view of the boom looking down the boom longitudinal axis.

FIG. 5 is a perspective view of the apparatus that supports the boom and translates it.

FIG. 6 is a cross section view of the boom translator taken along the longitudinal axis.

FIG. 7 is a side cross section view of the translator and the root bushing.

FIG. 8 is an elevational view within the housing depicting the tape reel and part of the drive apparatus.

DETAILED DESCRIPTION OF THE INVENTION

Figure 1:
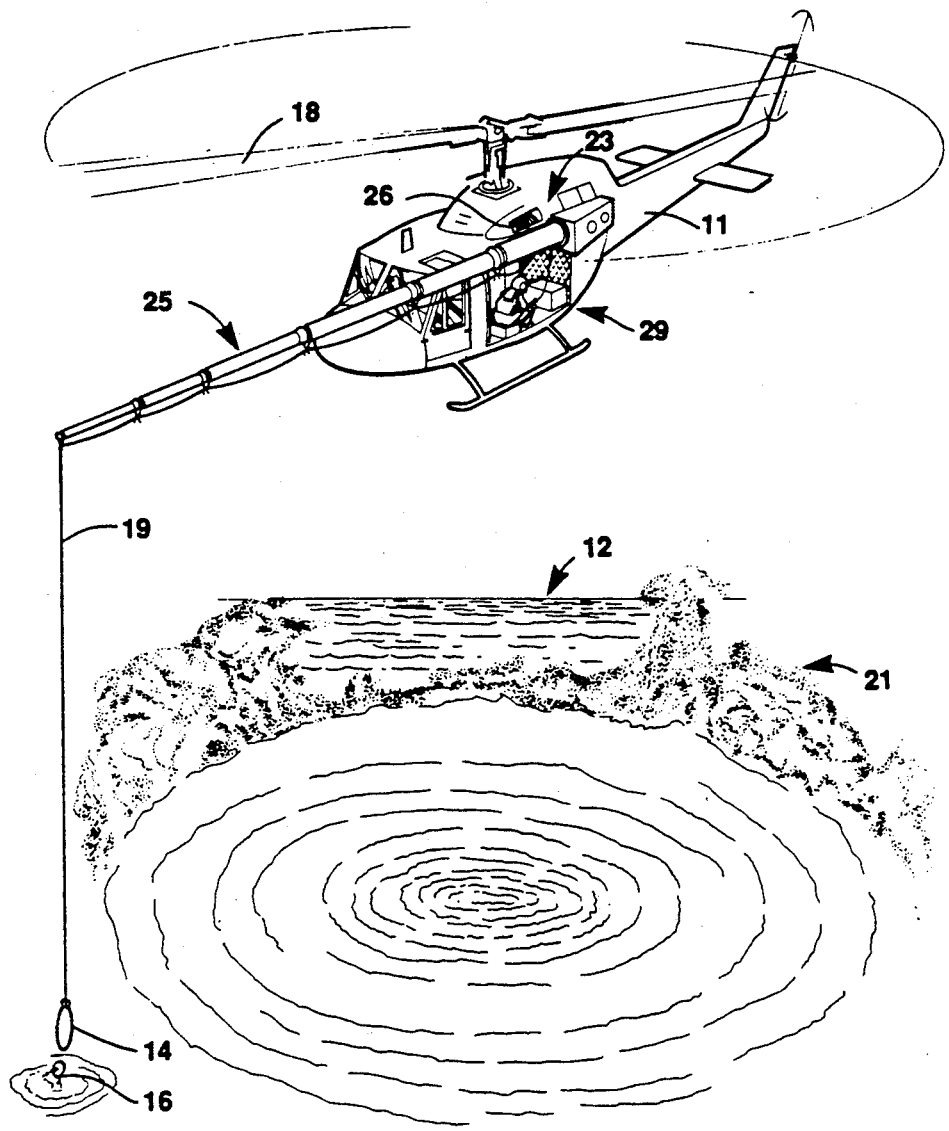
FIG. 1 is a perspective view of the rescue device mounted on a hovering helicopter with the boom extended.

Turning to FIG. 1, helicopter 11 has arrived to rescue victim 16 from sea 12 with airborne rescue system 10.

The downwash from main rotor 18 is disrupting the sea directly below the main rotor and producing spray and waves 21. Rescue collar, harness or net 14 is suspended from line 19 which is payed out by winch 23. The winch is partially enclosed by housing or pod 26 mounted on the roof of helicopter 11 near the main rotor axis. The collar 14 is extended beyond the tip of rotor 18 by telescoping boom 25. Line 19 passes through clips 28 fastened to the underside of boom 25. The clips encircle the line and have springy ends that either touch each other or are spaced apart less than the diameter of line 19. The ends of the clips are force sensitive. The clips will support the weight of line 19 and collar 14 but they will not support the weight of victim 16. Thus, when victim 16 grabs collar 14 and the downward tension on line 19 is increased to a predetermined level, clips 28 sequentially open as the line load progresses from the boom tip to boom root releasing line 19. Then the clip ends return to their normal position. (FIG. 3 more clearly illustrates how clip 28 temporarily retains line 19.) As soon as line 19 is released from clips 28, line 19 can assume a straight vertical path to winch 23. With winch 23 located directly over victim 16, undesirable torques will be minimized as the winch draws in victim 16 and pulls him to large side entrance 29. It can thus be seen that the telescoping boom 25 need not be a ponderous apparatus as it only has to support line 19 and collar 14, not the weight of the victim.

Figure 4:
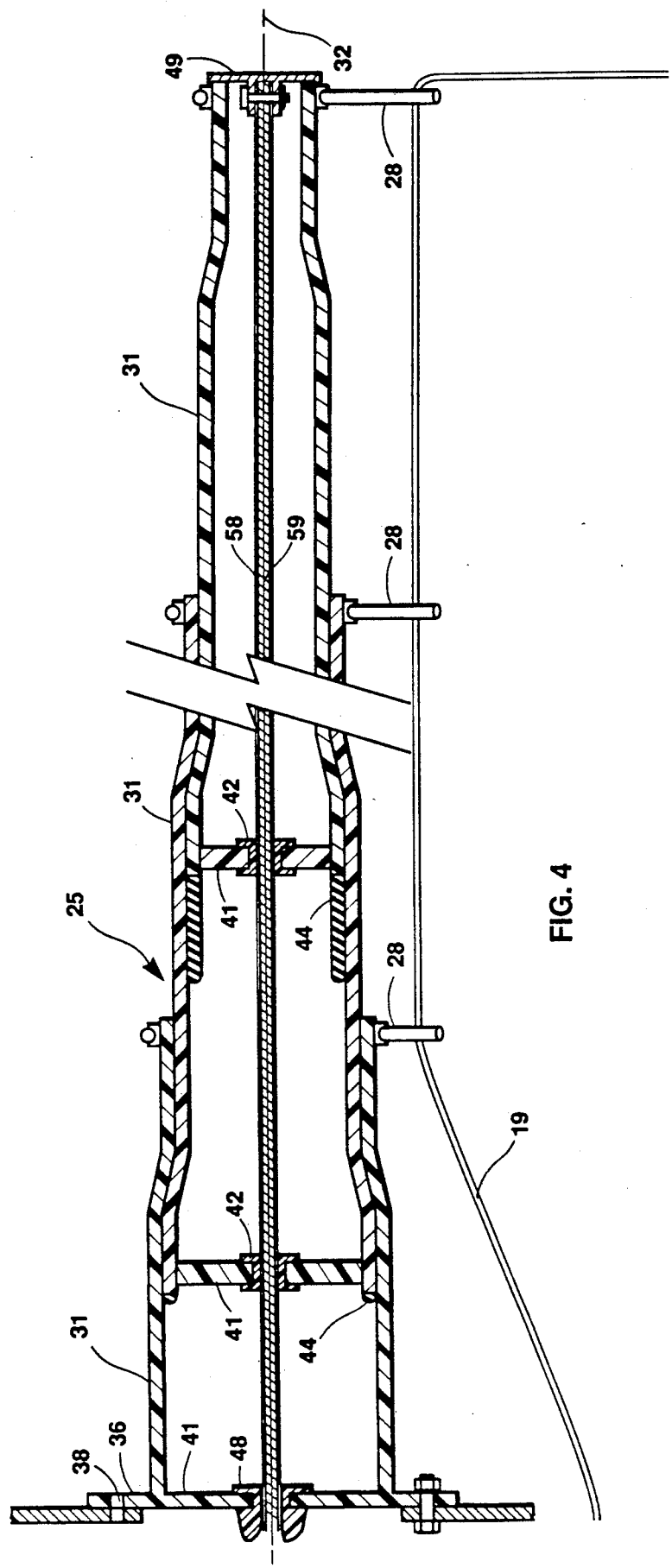
FIG. 4 is a side cross section view of the boom in the extended mode.

FIG. 2 is a cross section view of boom 25 in its retracted state. The boom comprises a plurality of nested telescoping members 31 that have a common longitudinal axis and axis of symmetry 32. Each telescoping member 31 has at least one tapered section 34. When the members 31 are translated, they slidably engage one another and tapered sections 34 serve as stops to prevent unlimited translation. Because of the tapered sections, for example, the innermost telescoping member 31 cannot be separated from its adjacent member when the boom is extended. The innermost member can only be extended until its tapered section 34 hits the tapered section 34 of the adjacent telescoping member. This motion limiting phenomenon brought about by tapered sections 34 is best illustrated in FIG. 4 where boom 25 is shown fully extended. The telescoping member 31 at the root of the boom has a flange 36 with apertures 38. Apertures 38 accommodate fasteners (not all illustrated) permitting boom 25 to be secured to housing 46 (FIG. 5). Each telescoping member 31 has a bulkhead 41 with a central aperture lined with a bushing 42 or 48. A resilient bumper 44 terminates the proximal end of each telescoping member except the member with flange 36. When the boom 25 is retracted each bumper 44 strikes the bulkhead 41 of an adjacent telescoping member. The bumpers may be made of rubber, for example, whereas the remainder and the bulk of the telescoping members are preferably made of lightweight composite material (such as fiberglass fabric impregnated with a cured resin). To prevent the rotation of the telescoping members about axis 32 and the misalignment of clips 28, the telescoping members preferably have a non-circular cross section as viewed along axis 32. The nesting telescope members 31 are preferably elliptical in cross section (best illustrated in FIG. 3) to enhance rigidity and reduce down load aerodynamic drag in the vertical plane, and to counter any tendency to twist or turn about axis 332.

An end plate 49 is fastened to the distal end of the innermost telescoping member 31. End plate 49 has a cylindrically-shaped cup 51 centrally located on the inner wall that receives an end of translator 57. Translator 57 is secured to cup 51 by a pin 53 or other fastening means. FIG. 6 is cross section view of translator 57 taken along axis 32. Translator 57 comprises a flexible non-compressible rope-like element 59 encircled by a thin, curled, tape 58 with slightly overlapping edges 62, 63. As translator 57 extends through bushings 42 it has a tube-like configuration and is rigid enough to extend the telescoping members 31 (as shown in FIG. 4) when it is translated in direction 66 by drive means illustrated in FIGS. 5 and 8. Rope 59 fills tape 58 and, being non-compressible, reduces any tendency for the kinking or collapse of the tube-like configuration made by tape 58 when it is inside telescoping members 31. Rope-like element 59 is preferably a wire rope, however, it may comprise a single stand of nylon, polypropylene, polyethylene, or a composite composition. Further, element 59 may be a wire helix whose turns have little or no spacing therebetween. As used herein, "rope" is intended to include all of these alternatives. The material for tape 58 may be selected from the following group: spring steel, stainless steel, beryllium copper, phosphor bronze, springy polymeric and composite compositions. The bushings may be made, for example, from Teflon ®.

FIG. 3 is an end view of telescoping boom 25 looking at the distal end of the boom and to avoid confusion only the clip 28 on the innermost member 31 has been illustrated. Straight segments 68 of clip 28 form a V and have a spacing 69 that is normally smaller than the diameter of line 19. When line 19 is pulled downward as described earlier, the spacing 69 temporarily enlarges to release line 19 from clip 28. Ends 71 of clip 28 form a large-angle V that facilitates the return of line 19 within clip 28 when the boom is "loaded" for a new rescue mission. When line 19 is pushed at the apex of the V made by ends 71, spacing 69 is temporarily expanded to admit line 19 within clip 28.

FIG. 5 depicts part of the root or proximal end of telescoping boom 25, the winch, and the drive apparatus that moves translator 57 to and fro to extend or retract boom 25. Tape 58 and rope 59 are stored on reels or spools 81 and 82, respectively. Spools 81 and 82 are coupled to electric motor 104 via gear/clutch box 103 A bracket 94 fastened to the floor of housing 46 supports bearing 97 (FIG. 8) in which axle 95 is free to rotate. Motor/gear unit 96 is coupled to one end of axle 95 and a roller 88 is fastened to the opposite end of the axle. Stanchions 84 encircled by springs 86 have their upper ends fastened to the ceiling of housing 46. The lower ends of stanchions 84 slidably engage matching orifices (not shown) in axle end members 101. The end members 101 are secured to opposite ends of axle 91. Roller 87 is centrally positioned on axle 91 and free to rotate about it by means of bearing 92. Idler roller 87 has a convex face 99 that matches the concave face 98 of roller 88. Tape 58 passes between faces 98, 99 of rollers 87, 87. As springs 86 attempt to expand they cause roller 87 to press downward on roller 88 and the tape there between. Thus, the tape is squeezed between the rollers.

Figure 9:
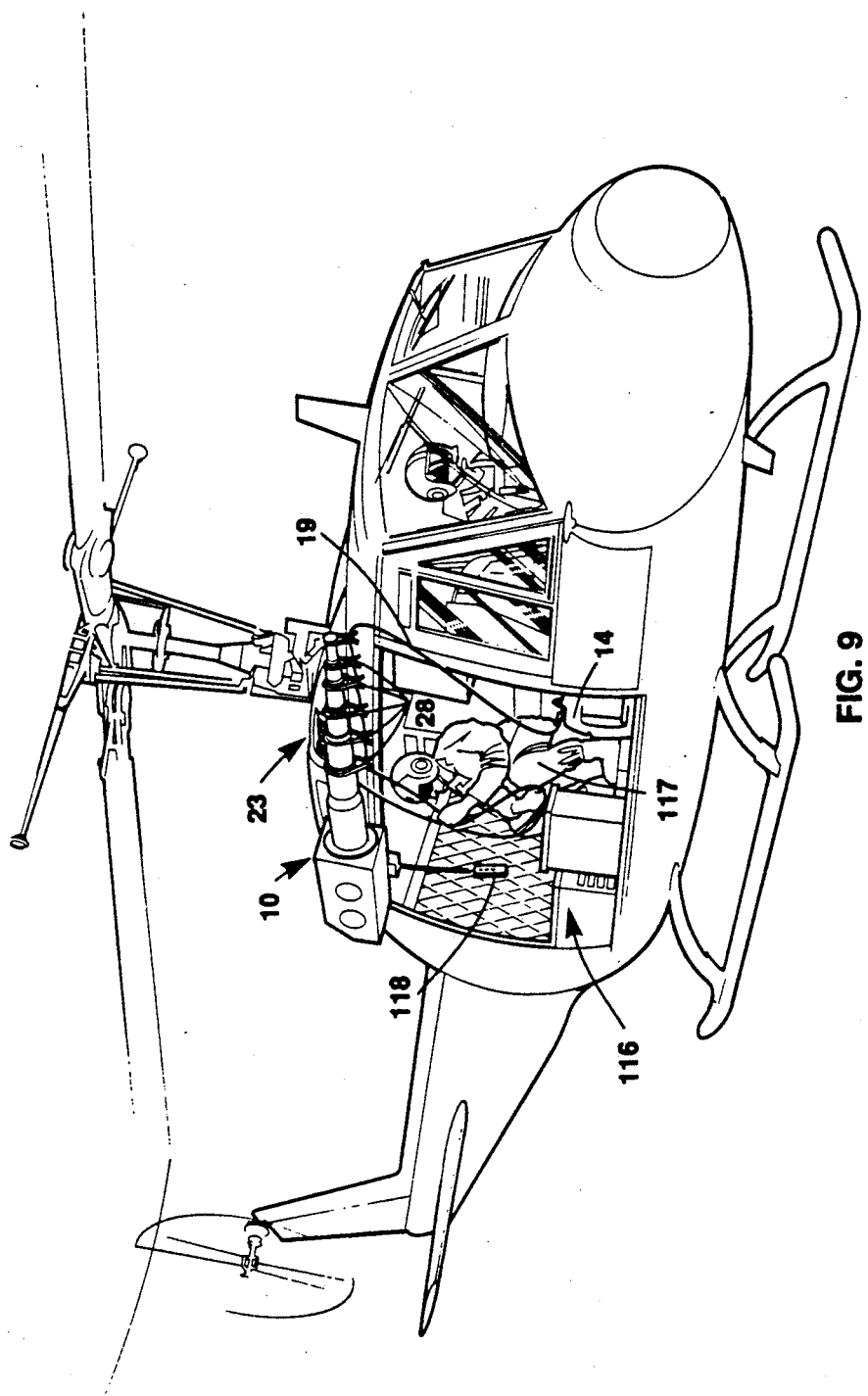
FIG. 9 is a perspective view of a helicopter carrying the rescue device wherein the boom is in a retracted condition.

Winch 23 includes a spool or reel 111, a take-up motor 112 and gears 114. The motor 112 freewheels when line 19 is stripped from the wheel. Motor 112 is energized and rotates spool 111 through gears 114 when it is desired to haul in the victim via line 19 and collar 14. It is preferred that winch 23 be located as near as possible to the axis of the helicopter main rotor and thus, depending on where housing 46 is fastened to the helicopter, winch 23 may be fastened to housing 46 with bracket 113, or winch 23 may be separated from housing 46 as shown in FIGS. 1 and 9.

FIG. 7 is a side cross section view of bushing 48 in the bulkhead 41 of the root telescoping member. The end 55 of bushing 48 facing into housing 46 has an orifice with a tapered face 54. It is at the entry of this bushing that tape 58 and rope 59 meet when translator 57 is extended, and the bushing completes the encirclement process started by rollers 87, 88 (see FIG. 8). That is, when tape 58 and rope 59 leave end 56 of bushing 48, tape 58 encircles rope 59 and tape 58 assumes a tube-like configuration. On the other hand, when the boom is retracted and the tape 58 and rope 59 pass through bushing 48 (in a leftward direction) the rope adjacent face 54 of the bushing orifice splits open the tube pattern of tape 58. By the time the retracted tape 58 passes rollers 87, 88 and reaches reel 81 it is basically flat with only a slight dishing. This enables the compact storage of tape 58.

Motor/gear unit 96 and rollers 87, 88 form one translator drive means whereas motor 104, gear/clutch box 103 and spools 81, 82 form a second translator drive means. The first drive means moves translator 57 in direction 66 and causes the extension of boom 25 whereas the second drive means moves translator 57 in the opposite direction and causes the boom to be retracted or collapsed. When motor 96 is energized, roller 88 is rotated and the tape squeezed between the rollers is pushed through bushing 48 and bushing 42. The tape 58 is joined with rope 59 at bushing 48 and the distal end of translator 57 pushes on end plate 49 until the boom is extended as illustrated in FIG. 4. During the extension process, rope 59 fills the cavity within tube-like tape 58 and tends to prevent the tube from collapsing or bending (veering from axis 32).

The second drive means is used to retract boom 25. When the second drive means is operative, motor 96 is turned off and freewheels. When motor 104 is energized, spools 81, 82 are rotated counterclockwise pulling in translator 57 toward the spools 81, 82. This causes the boom 25 to retract to the position illustrated in FIG. 2. Rope 59 is coiled on spool 82 and tape 58 is coiled on spool 81. A slip clutch in box 103 accounts for any size differences in the spool diameters and allows both the tape and the rope to be coiled at the same linear rate.

FIG. 9 illustrates the rescue system mounted on the right side of a helicopter over a doorway 116. Winch 23 is mounted on the helicopter roof forward of housing 26 and near the axis of the main rotor. The rescue collar 14 is beside operator 117 and line 19 has been pressed within clips 28. Control box 118 has switches for controlling motors 96, 104, and 111. In most helicopters the pilot sits in the right front seat. Thus, in this configuration, when the boom is extended the pilot's perspective of the boom will be preferable to the arrangement depicted in FIG. 1.

Although particular embodiments have been described and illustrated herein, it is recognized that modifications and variations may readily occur to those skilled in the art and consequently it is intended to cover such modifications and equivalents.

What is claimed is:

1. An airborne rescue system for extending a rescue line to a person in need of rescue comprising:
    a boom having a plurality of telescoping members:
    means on said telescoping members for retaining said rescue line next to said telescoping members when said boom is extended and releasing said line away from said boom when a predetermined downward tension is reached in said rescue line, said retaining and releasing means comprising a row of clips fastened to said boom; and
    wherein each telescoping member has a longitudinal axis, an elliptical cross section, and at least one tapered portion oriented in the direction of said longitudinal axis.

2. An airborne rescue system for extending a rescue line to a person in need of rescue comprising:
    a boom having a plurality of telescoping members:
    means on said telescoping members for retaining said rescue line next to said telescoping members when said boom is extended and releasing said line away from said boom when a predetermined downward tension is reached in said rescue line: and
    means for translating said telescoping members to or fro to extend or restrict said boom, said translating means including a translator comprising a rope and a curled tape having a tube-like configuration, and said rope fills said tape.

3. An airborne rescue system as claimed in claim 2 wherein said translating means also includes:
    a first reel for winding said tape thereon;
    a second reel for winding said rope thereon;
    roller means for taking tape from said tape reel and extending said telescoping members; and
    drive means for rotating said reels to simultaneously reel in said tape and said rope and retract said telescoping members.

4. An airborne rescue system as described in claim 3 wherein the tape stored on said tape reel is flattened and becomes curled before reaching said telescoping members.

5. An airborne rescue system for extending a rescue line to a person in need of rescue comprising:
    a helicopter having a main rotor:
    a boom having a plurality of telescoping members, said boom being mounted on said helicopter and capable of extending beyond the tip of said main rotor:
    a rescue line:
    a winch to pay out or retrieve said line:
    means on said telescoping members of retaining said rescue line next to said telescoping members when said boom is extended and releasing said line away from said boom when a predetermined tension is reached in said rescue line:
    means for translating said telescoping members to or fro to extend or retract said boom: and
    each said telescoping member having a longitudinal axis, an elliptical cross section, and at least one tapered portion oriented in the direction of the longitudinal axis.

6. An airborne rescue system as described in claim 5 wherein said retaining and releasing means comprises a row of clips fastened to said boom.

7. An airborne rescue system as set forth in claim 5 wherein said translating means includes a translator comprising a rope and curled tape having a tube-like configuration, and said rope fills said tape.

8. An airborne rescue system as claimed in claim 7 wherein said translating means also includes:
    a first spool for winding said tape thereon;
    a second spool for winding said rope thereon;

roller means for taking tape from said tape spool and extending said telescoping members; and drive means for rotating said spools to simultaneously spool in said tape and said rope and retract said telescoping members.

9. An airborne rescue system as described in claim 8 wherein the tape spooled on said tape spool is flattened and becomes curled before reaching said telescoping members.

10. An airborne rescue system for extending a rescue line to a person in need of rescue comprising:
- a lightweight boom having a plurality of telescoping members:
- a row of clips fastened to said boom, said clips each having an opening adapted to receive said rescue line and said line remaining within said clips until a predetermined level of tension is reached on said rescue line so as to separate said rescue line from said boom:
- translating means for moving said boom into an extended state or a retracted state; and
- each telescoping member having a longitudinal axis, an elliptical cross section, and at least one tapered portion oriented in the direction of said longitudinal axis.

11. An airborne rescue system for extending a rescue line to a person in need of rescue comprising:
- a lightweight boom have a plurality of telescoping members:
- a row of clips fastened to said boom, said clips each having an opening adapted to receive said rescue line and said line remaining within said clips until a predetermined level of tension is reached on said rescue line so as to separate said rescue line from said boom:
- translating means for moving said boom into an extended state or a retracted state; and
- said translating means including a translator comprising a rope and a tube-like tape surrounding said rope.

12. An airborne rescue system as set forth in claim 11 wherein each telescoping member has a bulkhead and a bushing therein adapted to allow the passage of said translator.

13. An airborne rescue system as described in claim 12 wherein all but one of said telescoping members has a bumper adapted to strike said bulkhead of the adjacent telescoping member when said telescoping members are retracted.

14. An airborne rescue system as claimed in claim 11 wherein said translating means includes means for separating said rope from said tape and for separately spooling said rope and said tape.

* * * * *